United States Patent
Ruan et al.

(10) Patent No.: US 10,752,156 B2
(45) Date of Patent: Aug. 25, 2020

(54) RATCHET CHAIN BINDER

(71) Applicants: Buqin Ruan, Zhejiang (CN); Zhengzhong Zhu, Zhejiang (CN)

(72) Inventors: Buqin Ruan, Zhejiang (CN); Zhengzhong Zhu, Zhejiang (CN)

(73) Assignee: Zhejiang Topsun Logistic Control Co., Ltd., Taizhou (CN)

(*) Notice: Subject to any disclaimer, the term of this patent is extended or adjusted under 35 U.S.C. 154(b) by 0 days.

(21) Appl. No.: 16/693,385

(22) Filed: Nov. 25, 2019

(65) Prior Publication Data

US 2020/0164786 A1 May 28, 2020

(51) Int. Cl.
*B60P 7/08* (2006.01)
*F16G 11/12* (2006.01)
*F16H 25/20* (2006.01)

(52) U.S. Cl.
CPC .............. *B60P 7/083* (2013.01); *F16G 11/12* (2013.01); *F16H 25/20* (2013.01); *F16H 2025/2059* (2013.01); *F16H 2025/2093* (2013.01)

(58) Field of Classification Search
CPC ........ B60P 7/083; B60P 7/0853; F16G 11/12; F16H 31/005; F16H 25/20; Y10T 24/2109; Y10T 24/2117; Y10T 24/2121; Y10T 24/2125; Y10T 24/2164; Y10T 24/2143
See application file for complete search history.

(56) References Cited

U.S. PATENT DOCUMENTS

| 310,767 | A | * | 1/1885 | Wilson | F16G 11/12 254/235 |
| 1,037,615 | A | * | 9/1912 | Grenier | F16G 3/006 254/232 |
| 3,338,359 | A | * | 8/1967 | Baillie | B63B 25/24 192/43.1 |
| 4,130,269 | A | * | 12/1978 | Schreyer | F16G 11/12 24/19 |
| 5,611,521 | A | * | 3/1997 | Grover | B25B 21/002 254/235 |

(Continued)

FOREIGN PATENT DOCUMENTS

AU 2018271146 A1 11/2018
CA 2922817 A1 9/2017
(Continued)

*Primary Examiner* — Emmanuel M Marcelo
(74) *Attorney, Agent, or Firm* — Minder Law Group; Willy H. Wong

(57) ABSTRACT

The ratchet chain binder comprises a seat, a rotating shaft, a ratchet, a handle capable of driving the ratchet to rotate, and two screw tightening components rotatably connected to the seat in a coaxial manner. Two drive bevel gears are disposed respectively on opposing ends of the two screw tightening components. The rotating shaft is provided with a transmission gear and a transmission bevel gear simultaneously engaging the two drive bevel gears, the rotating shaft is capable of driving the two screw tightening components to rotate and changing an overall length of the two screw tightening components. The transmission gear is disposed between the two screw tightening components, an intermediate gear is rotationally connected to the seat, and the ratchet is located above the intermediate gear and engages with the intermediate gear.

10 Claims, 7 Drawing Sheets

(56) References Cited

U.S. PATENT DOCUMENTS

| | | | | |
|---|---|---|---|---|
| 5,911,409 A * | 6/1999 | Grover | ............... | B25B 21/002 |
| | | | | 254/234 |
| 5,931,062 A * | 8/1999 | Marcovici | ............ | B25B 13/467 |
| | | | | 81/177.2 |
| 6,945,516 B1 * | 9/2005 | Scott | ................ | B60P 7/083 |
| | | | | 254/231 |
| 7,451,962 B1 * | 11/2008 | Kennedy | ............... | F16B 7/06 |
| | | | | 254/231 |
| 8,505,879 B2 * | 8/2013 | Ruan | ................. | B25B 13/48 |
| | | | | 254/232 |
| 8,851,255 B2 * | 10/2014 | Mitchell | ............ | B60P 7/083 |
| | | | | 192/43.1 |
| 9,236,151 B2 * | 1/2016 | Lorrette | ............. | C04B 35/52 |
| 10,384,591 B2 * | 8/2019 | Chao | ................ | B60P 7/083 |
| 2005/0224772 A1 | 10/2005 | Scott et al. | | |
| 2005/0243553 A1 * | 11/2005 | Picone | ............. | B25B 13/14 |
| | | | | 362/253 |
| 2008/0118324 A1 * | 5/2008 | Fritel | ................ | F16G 11/12 |
| | | | | 410/100 |
| 2008/0289843 A1 * | 11/2008 | Townsan | .............. | B25B 21/00 |
| | | | | 173/216 |
| 2014/0109361 A1 | 4/2014 | Helline | | |
| 2016/0195165 A1 | 7/2016 | Chou | | |
| 2018/0319311 A1 | 11/2018 | Chao | | |
| 2020/0062165 A1 * | 2/2020 | Wang | ................ | B60P 7/083 |

FOREIGN PATENT DOCUMENTS

| | | | |
|---|---|---|---|
| EP | 0831248 A2 | 3/1998 | |
| EP | 1744842 B1 | 12/2011 | |

* cited by examiner

RATCHET CHAIN BINDER

RELATED APPLICATIONS

This application claims priority to Chinese Patent Application No. CN201811417240.6, filed Nov. 26, 2018.

The above applications and all patents, patent applications, articles, books, specifications, other publications, documents, and things referenced herein are hereby incorporated herein in their entirety for all purposes. To the extent of any inconsistency or conflict in the definition or use of a term between any of the incorporated publications, documents, or things and the text of the present document, the definition or use of the term in the present document shall prevail.

BACKGROUND OF THE INVENTION

Field of Invention

The present invention belongs to the technical field of binding tools and relates to a ratchet chain binder.

Related Art

During transportation of goods, the goods usually need to be bundled. There are various types of ratchet chain binders, and the screw type ratchet chain binder is a tool that changes a distance between the hooks at both ends of the ratchet chain binder by changing a depth the screw being threaded into the screw sleeve to realize binding of the goods.

There are two kinds of conventional screw type ratchet chain binders, one is that the handle is disposed perpendicularly to the screw direction, such as the dynamometric rigid ratchet chain binder disclosed in the Chinese patent document (authorized publication number: CN201484273U). The ratchet is disposed on the adjusting member of the ratchet chain binder, the ratchet is driven to rotate by rotating the handle, and then the adjusting member is driven to rotate to realize binding. Although the ratchet chain binder has a simple structure, the handle is perpendicular to the tightening direction of the ratchet chain binder, when the ratchet chain binder performs vertical binding or tilted binding, it is not convenient and easy to exert an external force to pull and swing the handle, resulting in laborious operation. Moreover, the process of pulling the handle requires a spacious room, so in the case of limited space, the ratchet chain binder can be cumbersome to use.

Another conventional screw type ratchet chain binder is a structure in which the swinging direction of the handle is parallel to the screw direction, such as the ratchet type ratchet chain binder disclosed in the Chinese patent document (authorized publication number: CN207712359U). The ratchet chain binder includes the gear box, and the gear box is provided with three sets of bevel gears and one set of ratchet. One end of the third shaft pin is connected to the bevel gear, and the ratchet is fixed at another end of the third shaft pin. The handle is connected to the pawl through the first shaft pin, rotation of the handle drives the pawl to clutch with the ratchet to rotate, and then the bevel gear and the sleeve are driven to rotate to change a depth the screw being threaded into the sleeve to achieve binding. By disposing the bevel gear structure, the ratchet chain binder realizes changing of direction of the handle, so that the handle swings in the tightening direction of the ratchet chain binder, thereby making up for drawback of limited space during use, and the process of pulling the handle is also relatively more convenient and easy. The ratchet chain binder disposes the ratchet at the end portion of the third shaft pin, such a structure ensures that a spacing between the two opposing bevel gears is relatively small, so that the gear box is small in size and the overall mass is light. However, because the ratchet is provided at the end portion of the third shaft pin, the ratchet is made to locate at the lateral portion of the sleeve, such a structure of the ratchet chain binder has the following disadvantages. During use, through the handle the ratchet chain binder exerts a torque to the ratchet to drive the sleeve to rotate, as the ratchet chain binder gets tighter and tighter, a required operating force also gets greater and greater. The lower a transmission efficiency of force of the ratchet chain binder, the greater an operating force required to achieve a certain binding force. Because the ratchet of the ratchet chain binder is located at the lateral portion of the sleeve, during the process of pulling the handle, a torque exerted by the handle to the ratchet causes the ratchet chain binder to have a tendency to rotate, which is not only unsmooth to operate, but also a waste of force, and transmission of force is less efficient. Therefore, it is very laborious to operate when the binding force gets greater in the later stage of binding. Moreover, the same binding force requires a greater operating force, so the ratchet chain binder requires a greater operator's effort, otherwise the problem of poor binding effect may occur.

SUMMARY OF THE INVENTION

One object of one embodiment of the present invention is to solve the above problems in the prior art, and to provide a ratchet chain binder. The technical problem to be solved by the present invention is how to make operating the ratchet chain binder more labor-saving.

One object of one embodiment of the present invention can be achieved by the following technical solutions: A ratchet chain binder comprises a seat, a rotating shaft, a ratchet, a handle capable of driving the ratchet to rotate, and two screw tightening components rotatably connected to the seat in a coaxial manner. Two drive bevel gears are disposed respectively on opposing ends of the two screw tightening components. The rotating shaft is provided with a transmission gear and a transmission bevel gear simultaneously engaging the two drive bevel gears, the rotating shaft is capable of driving the two screw tightening components to rotate and changing an overall length of the two screw tightening components. Wherein the transmission gear is disposed between the two screw tightening components, an intermediate gear is rotationally connected to the seat, a plurality of teeth of the intermediate gear are arranged between the two drive bevel gears to engage with the transmission gear, and the ratchet is located above the intermediate gear and engages with the intermediate gear.

One embodiment of the ratchet chain binder disposes the transmission gear between the two screw tightening components so that the transmission gear is located at axes of the screw tightening components, and the transmission gear, the intermediate gear and the ratchet engage with each other, and a position of the transmission gear determines positions of the intermediate gear and the ratchet so that the transmission gear, the intermediate gear and the ratchet are on a same plane. In this way, when the handle acts on the ratchet to drive the ratchet to rotate, the handle is pulled at the top of the screw tightening components, not at the sides of the screw tightening components, which avoids the situation that pressure is exerted to the lateral portions of the screw tightening components to cause the ratchet chain binder to have a tendency to rotate. Therefore, force transmission efficiency is greatly improved, the process of pulling the ratchet chain binder is more labor-saving, and a same operating force can also achieve a greater binding force to improve binding effect.

In addition, for one embodiment of the ratchet chain binder, it is necessary to ensure that the handle has a sufficient swing range to avoid small swing range of the handle requiring an increased number of swings, resulting in laborious operation. When the transmission gear is disposed between the two screw tightening components, if the ratchet directly engages with the transmission gear to realize power transmission, the transmission gear is required to be made larger, so that a distance from an engagement point of the ratchet and the transmission gear to the rotating shaft is large in order to avoid contacting the drive bevel gears during swinging of the handle to ensure that the handle has a large swing range. Such disposition leads to a large spacing between the two drive bevel gears, and at the same time, a diameter of the transmission bevel gear is required to be made larger, resulting in a larger volume of the entire seat.

In order to solve the above problems, one embodiment of the ratchet chain binder is provided with the intermediate gear, and the teeth of the intermediate gear are arranged in a spacing between the two drive bevel gears to engage with the transmission gear, so that the diameter of the transmission gear can be reduced as much as possible, thereby ensuring the spacing between the two drive bevel gears is small in order to reduce a size of the transmission bevel gear and to ensure that the seat is small in size and light in mass, which make the ratchet chain binder light, easy and labor-saving to use. At the same time, with disposition of the intermediate gear, and the ratchet located above the intermediate gear and engaging with the intermediate gear, thereby ensuring that a sufficient spacing is provided between the ratchet and the rotating shaft for the handle to swing, so that a swing range of the handle is large to ensure that binding process is time-saving and labor-saving.

In one embodiment of the above-mentioned ratchet chain binder, each of the two screw tightening components comprises a sleeve rotatably disposed on the seat, an end face of a first end of the sleeve is provided with the drive bevel gear, a second end of the sleeve is inserted with a screw and the screw is threaded into the sleeve, and a free end of the screw is provided with a hook. When the rotating shaft rotates, the transmission bevel gear rotates together with the rotating shaft, and then the two sleeves are driven to rotate. Rotation directions of the two sleeves are opposite, thereby changing a depth the screw being threaded into the sleeve, and increasing or reducing a distance between the two hooks at both ends of the ratchet chain binder to achieve binding or loosening of goods.

In one embodiment of the above-mentioned ratchet chain binder, the transmission gear is located on an axis of the sleeve, and the transmission gear, the intermediate gear as well as the ratchet are located on a same plane. Such a structure allows the transmission gear to be located right in a middle of a radial direction of the sleeve, and the transmission gear, the intermediate gear as well as the ratchet are located on the same plane, thus completely avoiding the possibility of a torque exerted by the handle to the ratchet, and driving the ratchet chain binder to rotate, and therefore force is transmitted with better efficiency, and labor-saving effect is better.

In one embodiment of the above-mentioned ratchet chain binder, the transmission gear, the intermediate gear, and the ratchet are sequentially arranged along a radial direction of the rotating shaft; and an arrangement direction of the transmission gear, the intermediate gear, and the ratchet is perpendicular to a longitudinal direction of each of the two screw tightening components. Such a structure is capable of maximizing a distance from a hinge point of the handle to the sleeve under the condition that diameters of each of the gears are uniform, thus ensuring that the handle has a large swing range under the premise of a small volume of the seat. Large swing range of the handle, small volume and light mass of the seat are favorable for using the ratchet chain binder in a light, easy and labor-saving manner.

In one embodiment of the above-mentioned ratchet chain binder, the diameter of the transmission gear is smaller than a diameter of the drive bevel gear. The two drive bevel gears and the transmission gear cannot be in contact. Therefore, the diameter of the transmission gear is small, so that the spacing between the two drive bevel gears is small, a size of the transmission bevel gear is small, a volume of the seat is small, and a mass of the seat is light, which make the ratchet chain binder light, easy and labor-saving to use.

In one embodiment of the above-mentioned ratchet chain binder, a diameter of the intermediate gear is greater than or equal to the diameter of the transmission gear, and a diameter of the ratchet is greater than the diameter of the intermediate gear. Spaces in which the intermediate gear and the ratchet being positioned are respectively larger than an installing space of the transmission gear. Therefore, the diameter of the ratchet is larger than the diameter of the intermediate gear, and the diameter of the intermediate gear is larger than the diameter of the transmission gear, thus forming a two-stage downshift and achieving an object of labor-saving.

In one embodiment of the above-mentioned ratchet chain binder, the seat is provided with two shaft holes facing each other, inside each of the two shaft holes is fixedly disposed with a bushing, and the sleeves of the two screw tightening components are rotatably disposed in the two shaft holes respectively through the bushings. The bushing makes rotation of the sleeve more stable. After the bushing is additionally provided, the sleeve can be installed simply by opening a hole on the seat, thereby avoiding the situation to have the bushing integrally formed on the seat, so that the structure of the seat is simplified, and manufacturing is more convenient.

In one embodiment of the above-mentioned ratchet chain binder, the seat comprises two connected half-seats covering each other, the two half-seats are symmetrically disposed on two sides of the sleeve of each of the two screw tightening components, two ends of the rotating shaft are rotatably connected on the two half-seats respectively, an intermediate shaft located above the rotating shaft and a shaft pin located above the intermediate shaft are rotatably disposed between the two half-seats, and the intermediate gear is fixedly sleeved on the intermediate shaft. A ratchet end of the handle is rotatably sleeved on the shaft pin, and the ratchet is fixedly sleeved on the shaft pin. Since the transmission gear, the intermediate gear and the ratchet of the ratchet chain binder are arranged and disposed between the two sleeves, a bilaterally symmetrical structure is formed. Therefore, with the two half-seats symmetrically connecting with and covering each other, the two half-seats can be arranged structurally in a same shape and size, and can be manufactured and formed by a same mold, thereby greatly reducing the manufacturing cost.

In one embodiment of the above-mentioned ratchet chain binder, each of the two half-seats comprises two first side plates arranged perpendicular to a longitudinal direction of each of the two screw tightening components, a second side plate is connected between outer sides of the two first side plates of each of two half-seats, and the two ends of the rotating shaft and two ends of the intermediate shaft are rotatably connected on the two second side plates of the two half-seats respectively. An inner side of each of the two first side plates is provided with a semicircular notch, the two first side plates of one of the two half-seats are correspondingly buckled one-to-one to the two first side plates of the other of the two half-seats, and the notches on each pair of facing first side plates connecting to each other to form each of the shaft holes. The shaft holes formed by such a structure allow the two half-seats to be arranged as structures with a same shape and size for mounting the bushings, thereby greatly reducing the manufacturing cost. At the same time, since the two ends of the rotating shaft and the two ends of the intermediate shaft are rotatably connected on two second side plates of the two half-seats respectively; during assembling, mounting holes are opened on the second side plates, and the transmission gear and the intermediate gear are respectively pre-arranged on the rotating shaft and the intermediate shaft, and then the two half-seats cover each other, and the two ends of the rotating shaft and the two ends of the intermediate shaft are inserted into the corresponding mounting holes, so that assembly of each of the components can be realized, thereby making assembly of the ratchet chain binder more convenient.

In one embodiment of the above-mentioned ratchet chain binder, tops of the two half-seats are respectively provided with vertical plates, the vertical plates of the two half-seats are respectively located by two sides of the ratchet and facing each other, and two ends of the shaft pin are respectively rotatably connected on the two vertical plates. As such, such a structure makes assembly of the ratchet chain binder convenient.

In one embodiment of the above-mentioned ratchet chain binder, each of the two half-seats is a one-piece structure, the two half-seats are of a same shape and size, and the two half-seats are fixedly connected by bolts. Such a design allows the half-seats to be manufactured and formed using a same mold, thereby greatly reducing the manufacturing cost. At the time of installation, simply cover the two half-seats with each other and then turn the bolts for connection, which make assembly of the ratchet chain binder very convenient.

Compared with the prior art, one embodiment of the ratchet chain binder of the present invention has the following advantages:
1. The transmission gear of the ratchet chain binder is located at the axes of the screw tightening components, the handle is pulled at the top of the screw tightening components, not at the sides of the screw tightening components, which avoids the situation that pressure is exerted to the lateral portions of the screw tightening components to cause the ratchet chain binder to have a tendency to rotate. Therefore, force transmission efficiency is greatly improved, and the ratchet chain binder has the advantage of labor-saving during use.
2. With the ratchet chain binder provided with the intermediate gear, the diameter of the transmission gear can be reduced, and the ratchet chain binder has the advantages of small volume and light mass.
3. Since the transmission gear, the intermediate gear and the ratchet of the ratchet chain binder are arranged and disposed between the two sleeves, a bilaterally symmetrical structure is formed. Therefore, with the two half-seats symmetrically connecting with and covering each other, the two half-seats can be arranged structurally in a same shape and size, and can be manufactured and formed by a same mold, thereby greatly reducing the manufacturing cost.

DETAILED DESCRIPTION OF THE INVENTION

The technical solutions of the present invention are further described below with reference to the specific embodiments of the present invention in conjunction with the accompanied drawings, but the present invention is not limited to the embodiments.

Embodiment 1

Figure 1:
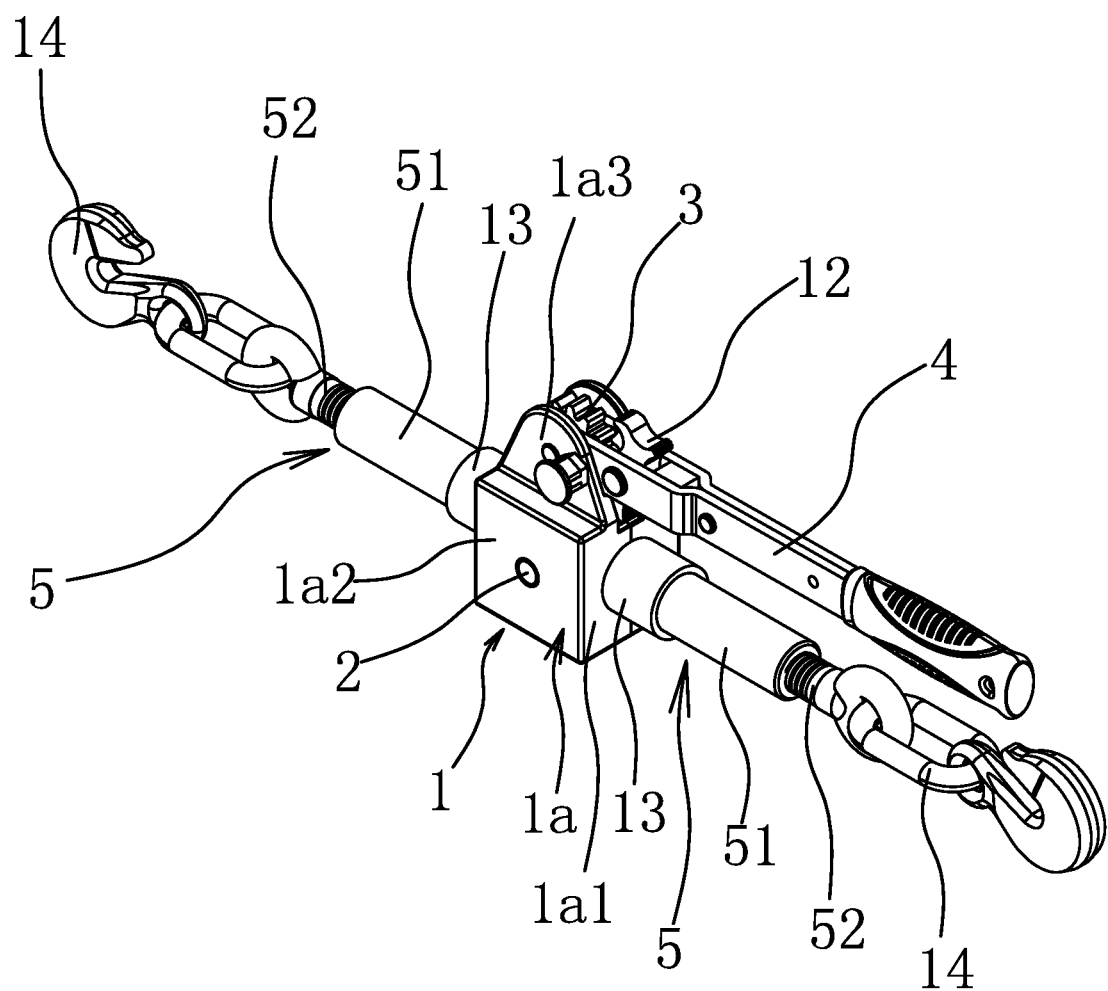
FIG. 1 is a perspective view of a first embodiment of a ratchet chain binder.

As shown in FIG. 1, one embodiment of a ratchet chain binder comprises a seat 1, a ratchet 3, a handle 4 capable of driving the ratchet 3 to rotate, and two screw tightening components 5 rotatably connected to the seat 1 in a coaxial manner. Each of the two screw tightening components 5 comprises a sleeve 51 rotatably disposed on the seat 1, a second end 512 of the sleeve 51 is inserted with a screw 52 and the screw 52 is threaded into the sleeve 51, and a free end of the screw is provided with a hook 14.

Figure 2:
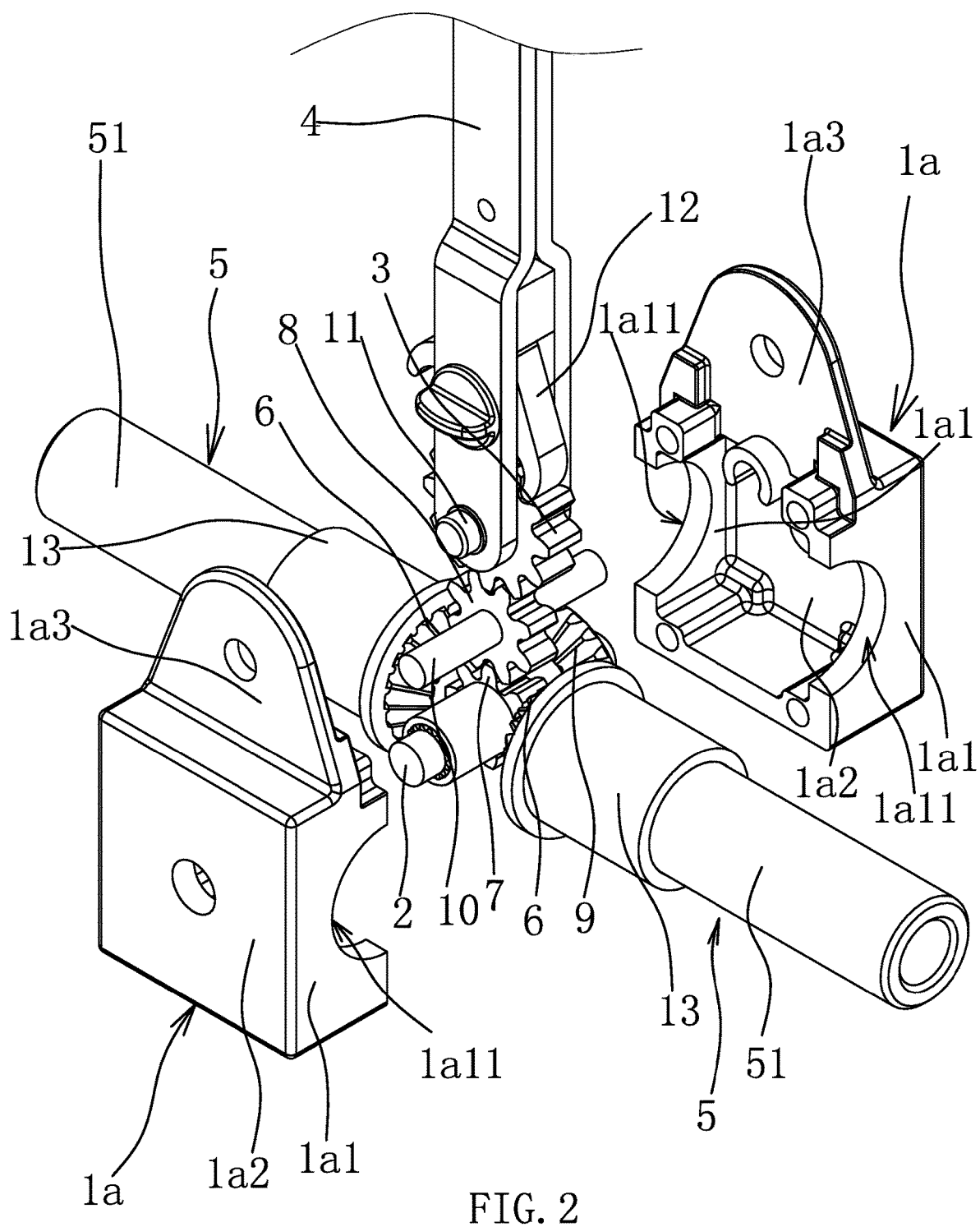
FIG. 2 is a partial exploded view of the first embodiment of the ratchet chain binder.
Figure 3:
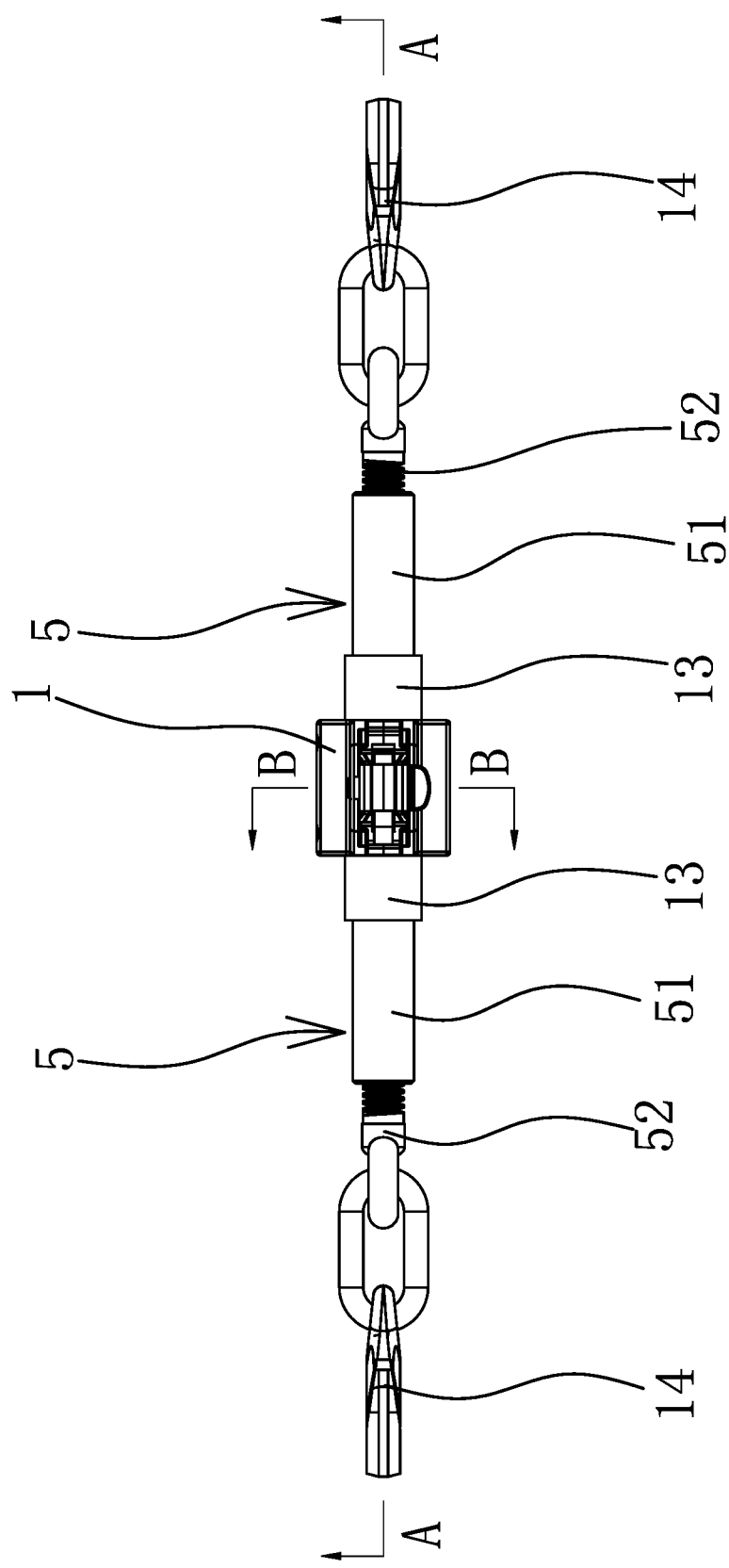
FIG. 3 is a top view of the first embodiment of the ratchet chain binder.
Figure 4:
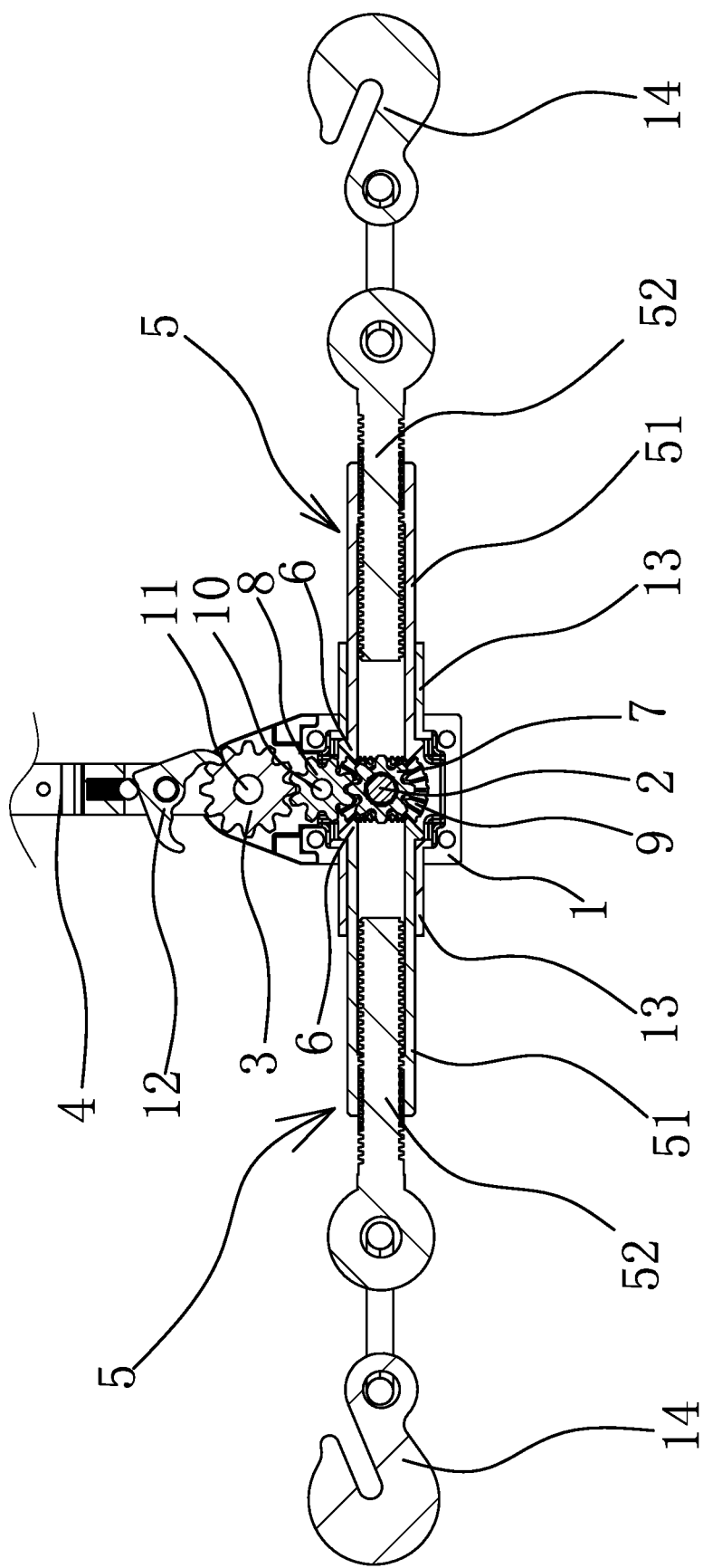
FIG. 4 is a cross-sectional view of A-A of FIG. 3.

As shown in FIG. 2, FIG. 3 and FIG. 4, one embodiment of the handle 4 drives the ratchet 3 to rotate through a pawl 12. A rotating shaft 2 is rotatably disposed in the seat 1, the rotating shaft 2 is perpendicular to the sleeves 51, end faces of opposing first ends 511 of the two sleeves 51 are respectively provided with a drive bevel gear 6, and the drive bevel gear 6 is integrally formed with the sleeve 51. The rotating shaft 2 is provided with a transmission gear 7 and a transmission bevel gear 9 simultaneously engaging the two drive bevel gears 6. When the rotating shaft 2 rotates, the transmission bevel gear 9 rotates together with the rotating shaft 2, and then the two sleeves 51 are driven to rotate. Rotation directions of the two sleeves 51 are opposite, at this time are capable of changing a depth the screw 52 being threaded into the sleeve 51, thereby changing an overall length of the two screw tightening components 5, and increasing or reducing a distance between the two hooks 14 at both ends of the ratchet chain binder to achieve binding or loosening of goods.

Figure 5:
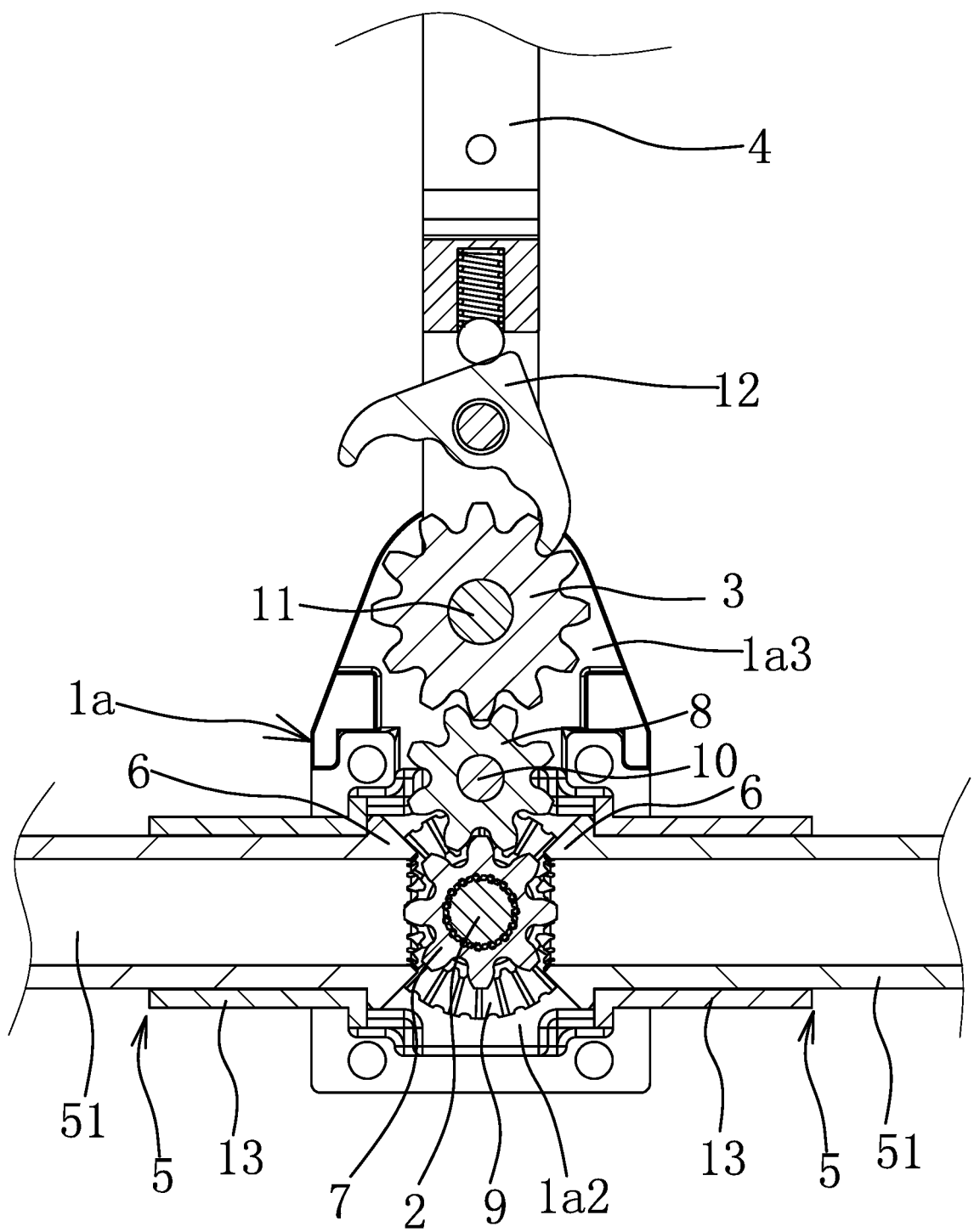
FIG. 5 is a partial cross-sectional view of the first embodiment of the ratchet chain binder.
Figure 6:
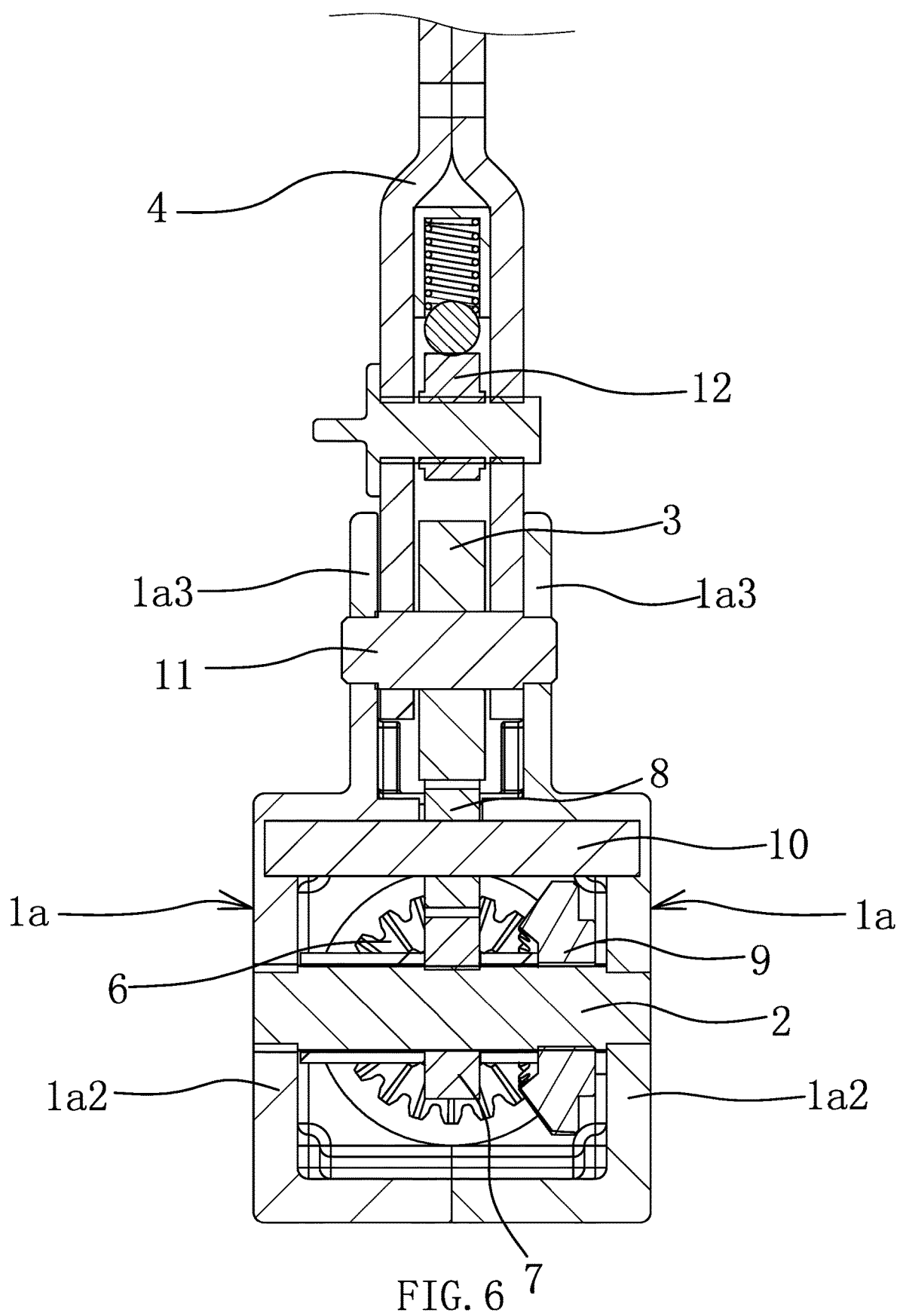
FIG. 6 is a cross-sectional view of B-B of FIG. 3.

As shown in FIG. 5 and FIG. 6, one embodiment of the transmission gear 7 is disposed between the two screw tightening components 5 and located on an axis of the sleeve 51, an intermediate gear 8 is rotationally connected inside the seat 1, and a diameter of the transmission gear 7 is smaller than a diameter of the drive bevel gear 6. A plurality of teeth of the intermediate gear 8 are arranged between the two drive bevel gears 6 to engage with the transmission gear 7, and the ratchet 3 is located above the intermediate gear 8 and engages with the intermediate gear 8. The transmission gear 7, the intermediate gear 8, and the ratchet 3 are sequentially arranged along a radial direction of the rotating shaft 2. An arrangement direction of the transmission gear 7, the intermediate gear 8, and the ratchet 3 is perpendicular to a longitudinal direction of each of the two screw tightening components 5. A diameter of the intermediate gear 8 is equal to the diameter of the transmission gear 7, and a diameter of the ratchet 3 is greater than the diameter of the intermediate gear 8. Such a structure is capable of maximizing a distance from a hinge point of the handle 4 to the sleeve 51 under the condition that the diameters of each of the gears are uniform, thus ensuring that the handle 4 has a large swing range under the premise of a small volume of the seat 1. Large swing range of the handle 4, small volume and light mass of the seat 1 are favorable for using the ratchet chain binder in a light, easy and labor-saving manner. Furthermore, a space in which the intermediate gear 8 being positioned is larger than an installing space of the transmission gear 7, and therefore, the diameter of the intermediate gear 8 is larger than the diameter of the transmission gear 7, thus forming downshift and achieving an object of labor-saving. The transmission gear 7, the intermediate gear 8 as well as the ratchet 3 are located on a same plane. Such a structure allows the transmission gear 7 to be located right at the extension line of the axis of the sleeve 51, and the transmission gear 7, the intermediate gear 8 as well as the ratchet 3 are located on the same plane, thus completely avoiding the possibility of a torque exerted by the handle 4 to the ratchet 3, and driving the ratchet chain binder to rotate, and therefore force is transmitted with better efficiency, and labor-saving effect is better.

One embodiment of the ratchet chain binder disposes the transmission gear 7 between the two screw tightening components 5 so that the transmission gear 7 is located at axes of the screw tightening components 5, and the transmission gear 7, the intermediate gear 8 and the ratchet 3 engage with each other, and a position of the transmission gear 7 determines positions of the intermediate gear 8 and the ratchet 3 so that the transmission gear 7, the intermediate gear 8 and the ratchet 3 are on a same plane. In this way, when the handle 4 acts on the ratchet 3 to drive the ratchet 3 to rotate, the handle 4 is pulled at the top of the screw tightening components 5, not at the sides of the screw tightening components 5, which avoids the situation that pressure is exerted to the lateral portions of the screw tightening components 5 to cause the ratchet chain binder to have a tendency to rotate. Therefore, force transmission efficiency is greatly improved, the process of pulling the ratchet chain binder is more labor-saving, and a same operating force can also achieve a greater binding force. At the same time, the ratchet chain binder is provided with the intermediate gear 8, and the teeth of the intermediate gear 8 are arranged in a spacing between the two drive bevel gears 6 to engage with the transmission gear 7, so that the diameter of the transmission gear 7 can be reduced as much as possible, thereby ensuring the spacing between the two drive bevel gears 6 is small in order to reduce a size of the transmission bevel gear 9 and to ensure that the seat 1 is small in size and light in mass, which make the ratchet chain binder light, easy and labor-saving to use. At the same time, with disposition of the intermediate gear 8, thereby ensuring that a sufficient spacing is provided between the ratchet 3 and the rotating shaft 2 for the handle 4 to swing, so that a swing range of the handle 4 is large to ensure that binding process is labor-saving.

Figure 7:
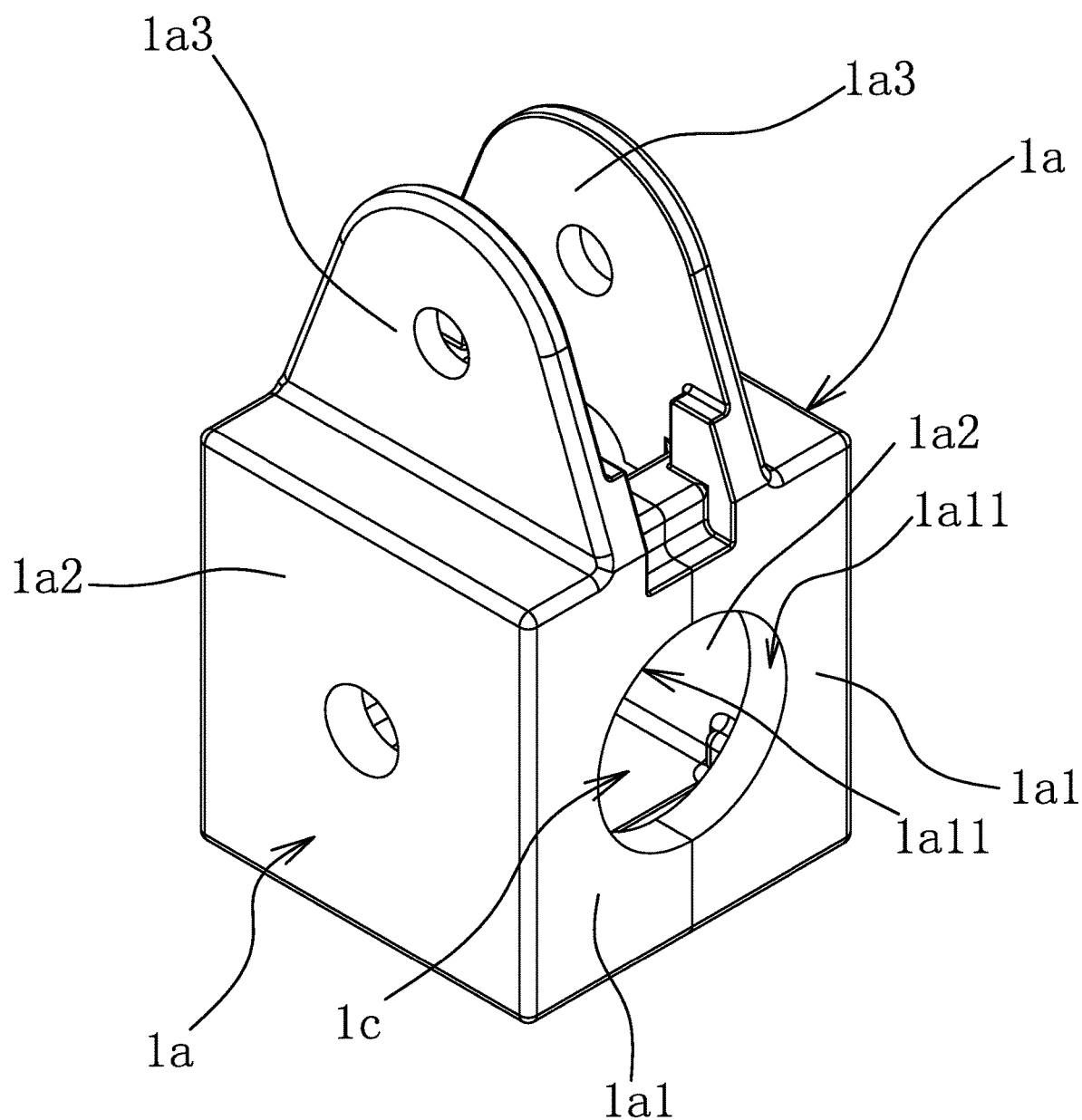
FIG. 7 is a perspective view of the structure of a seat of the first embodiment of the ratchet chain binder.

As shown in FIG. 7, one embodiment of the seat 1 is provided with two shaft holes 1c facing each other, an outer wall of each of the sleeves 51 is respectively sleeved with a bushing 13 capable of rotating relative to the sleeve 51, and the sleeves 51 of the two screw tightening components 5 are rotatably disposed in the two shaft holes 1c respectively through the bushings 13. Specifically, as shown in FIG. 2, the seat 1 comprises two connected half-seats 1a covering each other, each of the two half-seats 1a is a one-piece structure, the two half-seats 1a are of a same shape and size, and the two half-seats 1a are fixedly connected by bolts.

As shown in FIG. 2, one embodiment of the two half-seats 1a are symmetrically disposed on two sides of the sleeve 51 of each of the two screw tightening components 5, each of the two half-seats 1a comprises two first side plates 1a1 arranged perpendicular to a longitudinal direction of each of the two screw tightening components 5, and a second side plate 1a2 is connected between outer sides of the two first side plates 1a1 of each of two half-seats 1a. An intermediate shaft 10 is disposed in the seat 1, the intermediate gear 8 is fixedly sleeved on the intermediate shaft 10. Two ends of the rotating shaft 2 and two ends of the intermediate shaft 10 are rotatably connected on the two second side plates 1a2 of the two half-seats 1a respectively. Tops of the two half-seats 1a are further respectively provided with vertical plates 1a3, the vertical plates 1a3 of the two half-seats 1a are respectively located by two sides of the ratchet 3 and facing each other. A shaft pin 11 located above the intermediate shaft 10 is further rotatably disposed between the two half-seats 1a, two ends of the shaft pin 11 are respectively rotatably connected on the two vertical plates 1a3. A ratchet end 41 of the handle 4 is rotatably sleeved on the shaft pin 11, the ratchet 3 is fixedly sleeved on the shaft pin 11. An inner side 1a12 of each of the two first side plates 1a1 is provided with a semicircular notch 1a11, the two first side plates 1a1 of one of the two half-seats 1a are correspondingly buckled one-to-one to the two first side plates 1a1 of the other of the two half-seats 1a, and the notches 1a11 on each pair of facing first side plates 1a1 connecting to each other to form each of the shaft holes 1c. The shaft holes 1c formed by such a structure allow the two half-seats 1a to be arranged as structures with a same shape and size for mounting the bushings 13, thereby greatly reducing the manufacturing cost. Since the transmission gear 7, the intermediate gear 8 and the ratchet 3 of the ratchet chain binder are arranged and disposed between the two sleeves 51, a bilaterally symmetrical structure is formed. Therefore, with the two half-seats 1a symmetrically connecting with and covering each other, the two half-seats 1a can be arranged structurally in a same shape and size, and can be manufactured and formed by a same mold, thereby greatly reducing the manufacturing cost. At the same time, since the two ends of the rotating shaft 2 and the two ends of the intermediate shaft 10 are rotatably connected on two second side plates 1a2 of the two half-seats 1a respectively; during assembling, mounting holes are opened on the second side plates 1a2, and the transmission gear 7 and the intermediate gear 8 are respectively pre-arranged on the rotating shaft 2 and the intermediate shaft 10, and then the two half-seats 1a cover each other, and the two ends of the rotating shaft 2 and the two ends of the intermediate shaft 10 are inserted into the corresponding mounting holes, so that assembly of each of the components can be realized, thereby making assembly of the ratchet chain binder more convenient.

Embodiment 2

The structures and principles of this embodiment are basically the same as those of the first embodiment, and the differences are that the diameter of the intermediate gear 8 is greater than the diameter of the transmission gear 7. Spaces in which the intermediate gear 8 and the ratchet 3 being positioned are respectively larger than an installing space of the transmission gear 7. Therefore, the diameter of the ratchet 3 is larger than the diameter of the intermediate gear 8, and the diameter of the intermediate gear 8 is larger than the diameter of the transmission gear 7, thus forming a two-stage downshift and achieving an object of labor-saving.

The specific embodiments described herein are merely illustrative of the spirit of the present invention. Technical personnel skilled in the art to which the present invention pertains can make various modifications or additions to the specific embodiments described or replace them in a similar manner, without departing from the spirit of the present invention or beyond the scope defined by the appended claims.

Although the technical terms seat 1, half-seat 1a, first side plate 1a1, notch 1a11, second side plate 1a2, vertical plate 1a3, shaft hole 1c, rotating shaft 2, ratchet 3, handle 4, screw component 5, sleeve 51, screw 52, drive bevel gear 6, transmission gear 7, intermediate gear 8, transmission bevel gear 9, intermediate shaft 10, shaft pin 11, pawl 12, bushing 13, hook 14, and the like are used more frequently herein, the possibility of using other technical terms is not excluded. These technical terms are merely used to describe and explain the nature of the present invention more conveniently; construing them as any additional limitation is contrary to the spirit of the present invention.

LIST OF REFERENCED PARTS 1 seat
1a half-seat
1a1 first side plate
1a11 notch
1a12 inner side
1a2 second side plate
1a3 vertical plate
1c shaft hole
2 rotating shaft
3 ratchet
4 handle
41 ratchet end
5 screw component
51 sleeve
511 first end
512 second end
52 screw
6 drive bevel gear
7 transmission gear
8 intermediate gear
9 transmission bevel gear
10 intermediate shaft
11 shaft pin
12 pawl
13 bushing
14 hook

What is claimed is:

1. A ratchet chain binder comprising a seat, a rotating shaft, a ratchet, a handle capable of driving the ratchet to rotate, and two screw tightening components rotatably connected to the seat in a coaxial manner, two drive bevel gears disposed respectively on opposing ends of the two screw tightening components, the rotating shaft provided with a transmission gear and a transmission bevel gear simultaneously engaging the two drive bevel gears, the rotating shaft being capable of driving the two screw tightening components to rotate and changing an overall length of the two screw tightening components, wherein the transmission gear is disposed between the two screw tightening components, an intermediate gear is rotationally connected to the seat, a plurality of teeth of the intermediate gear are arranged between the two drive bevel gears to engage with the transmission gear, and the ratchet is located above the intermediate gear and engages with the intermediate gear.

2. The ratchet chain binder as claimed in claim 1, wherein each of the two screw tightening components comprises a sleeve rotatably disposed on the seat, an end face of a first end of the sleeve is provided with the drive bevel gear, a second end of the sleeve is inserted with a screw and the screw is threaded into the sleeve.

3. The ratchet chain binder as claimed in claim 2, wherein the transmission gear is located on an axis of the sleeve.

4. The ratchet chain binder as claimed in claim 2, wherein the seat is provided with two shaft holes facing each other, inside each of the two shaft holes is fixedly disposed with a bushing, and the sleeves of the two screw tightening components are rotatably disposed in the two shaft holes 1c respectively through the bushings.

5. The ratchet chain binder as claimed in claim 4, wherein the seat comprises two connected half-seats covering each other, the two half-seats are symmetrically disposed on two sides of the sleeve of each of the two screw tightening components, two ends of the rotating shaft are rotatably connected on the two half-seats respectively, an intermediate shaft located above the rotating shaft and a shaft pin located above the intermediate shaft are rotatably disposed between the two half-seats, the intermediate gear is fixedly sleeved on the intermediate shaft, a ratchet end of the handle is rotatably sleeved on the shaft pin, and the ratchet is fixedly sleeved on the shaft pin.

6. The ratchet chain binder as claimed in claim 5, wherein each of the two half-seats comprises two first side plates arranged perpendicular to a longitudinal direction of each of the two screw tightening components, a second side plate is connected between outer sides of the two first side plates of each of two half-seats, the two ends of the rotating shaft and two ends of the intermediate shaft are rotatably connected on two second side plates of the two half-seats respectively, an inner side of each of the two first side plates is provided with a semicircular notch, the two first side plates of one of the two half-seats are correspondingly buckled one-to-one to the two first side plates of the other of the two half-seats, and the notches on each pair of facing first side plates connecting to each other to form each of the shaft holes.

7. The ratchet chain binder as claimed in claim 5, wherein each of the two half-seats is a one-piece structure, the two half-seats are of a same shape and size, and the two half-seats are fixedly connected by bolts.

8. The ratchet chain binder as claimed in claim 1, wherein the transmission gear, the intermediate gear, and the ratchet are sequentially arranged along a radial direction of the rotating shaft; and wherein an arrangement direction of the transmission gear, the intermediate gear, and the ratchet is perpendicular to a longitudinal direction of each of the two screw tightening components.

9. The ratchet chain binder as claimed in claim 1, wherein a diameter of the transmission gear is smaller than a diameter of the drive bevel gear.

10. The ratchet chain binder as claimed in claim 1, wherein a diameter of the intermediate gear is greater than or equal to a diameter of the transmission gear, and a diameter of the ratchet is greater than the diameter of the intermediate gear.

\* \* \* \* \*